United States Patent Office.

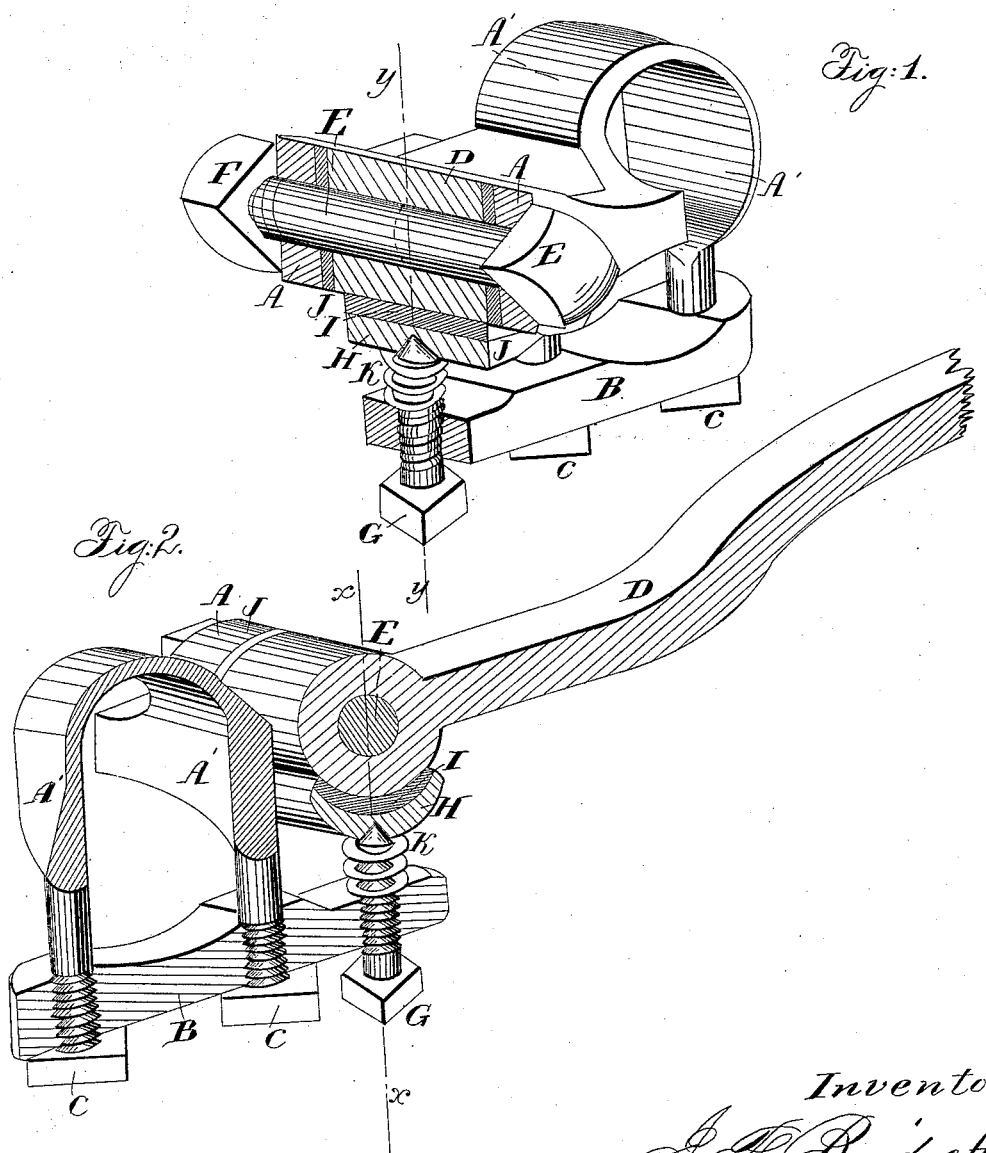

JOHN F. BRIDGET, OF WASHINGTON, DISTRICT OF COLUMBIA.

Letters Patent No. 61,310, dated January 22, 1867.

IMPROVED THILL-COUPLING.

*The Schedule referred to in these Letters Patent and making part of the same.*

TO ALL WHOM IT MAY CONCERN:

Be it known that I, JOHN F. BRIDGET, of the city and county of Washington, and District of Columbia, have invented a new and improved Thill-Coupling; and I do hereby declare the following to be a full, clear, and exact description of the same, sufficient to enable one skilled in the art to which the invention appertains to make use of it, reference being had to the accompanying drawings, which form a part of this specification, and in which—

Figure 1 is a perspective view and partial section on the plane $x\ x$, fig. 2.

Figure 2 is also a perspective view from a different point of view, and a partial section on the line $y\ y$, fig. 1.

The thill, at the point of its articulation with the clip-iron, is supported by a set-plate, whose screw is threaded into the forward extended end of the plate under the axle, through which the bolts of the axle-clip pass. A packing intervenes between the set-plate and the thill, which latter is prevented from jarring by being pressed upward against it bearings.

In the drawings, A' is the clip, which embraces the axle, and B the plate below, through which the bolts pass to be secured by the nuts C C. The cheeks A A, between which the end of the thill D is socketed, are a part of the plate-clip A', and the packing-washers J J, which intervene between the thill and the cheeks, are intended to prevent jarring. The attachment of the thill to the clip is made by the bolt E and its nut F. The plate B is extended forward under the thill, so as to form a support therefor by means of the set-screw G and the plate H, which rests thereon. Packing, I, is introduced between the plate H and the thill, so as to form a noiseless bed for the latter, which is adjusted so as to press with the required force underneath the thill to keep it from rattling. The spring K, between the plates B and H, also tends to keep the latter raised during any temporary slackness of the set-screw.

Having described my invention, what I claim therein as new, and desire to secure by Letters-Patent, is—

The combination of the set-screw G and socket-plate H and spring K, operating to raise the end of the thill in its bearings, substantially as and for the purpose described.

JOHN F. BRIDGET.

Witnesses:
SOLON C. KEMON,
JOHN A. WIEDERSHEIM.